W. H. HERMSDORF.
MACHINE FOR COATING ARTICLES.
APPLICATION FILED JAN. 7, 1916. RENEWED MAR. 27, 1919.
1,319,867.
Patented Oct. 28, 1919.
3 SHEETS—SHEET 3.
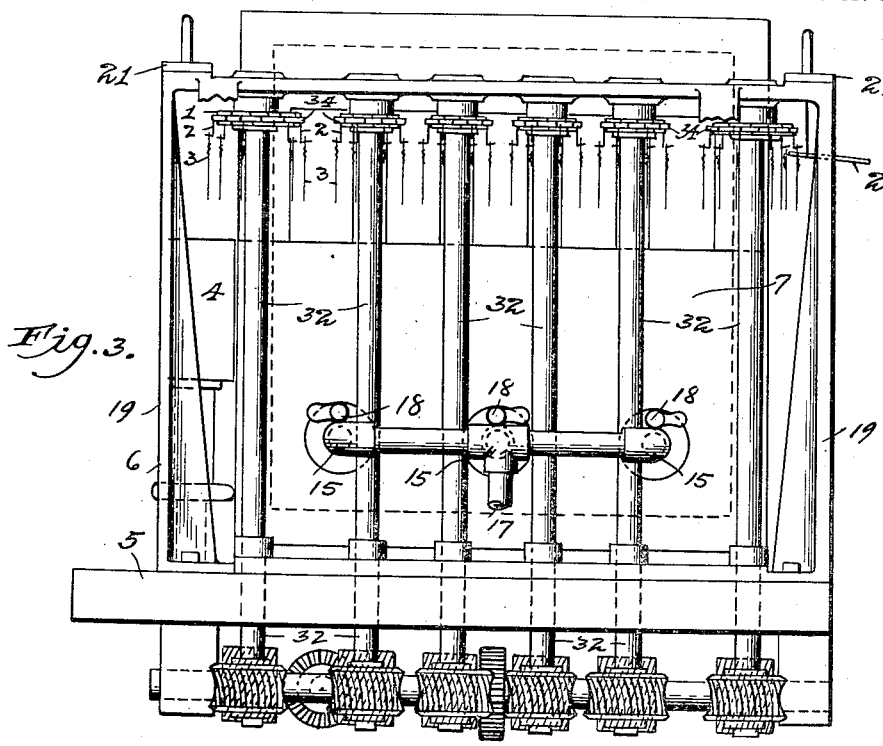
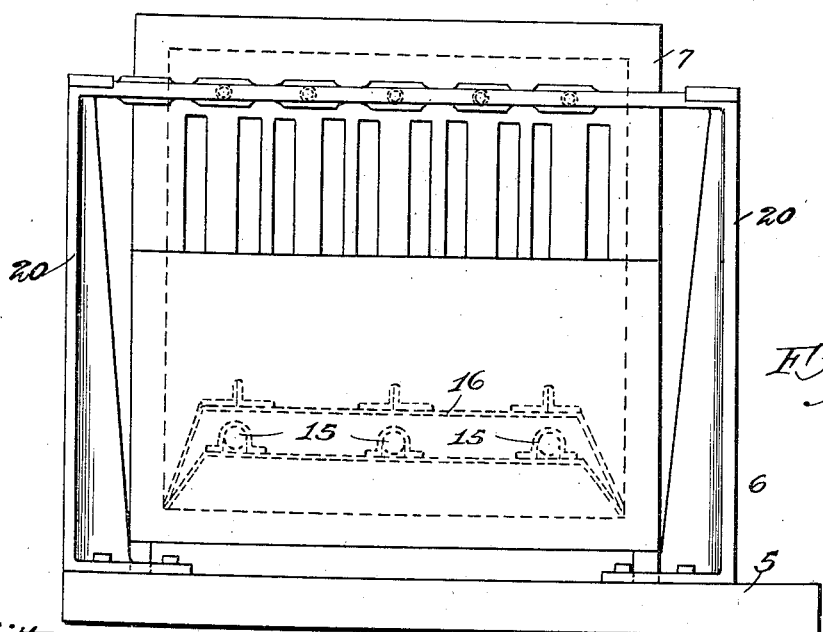

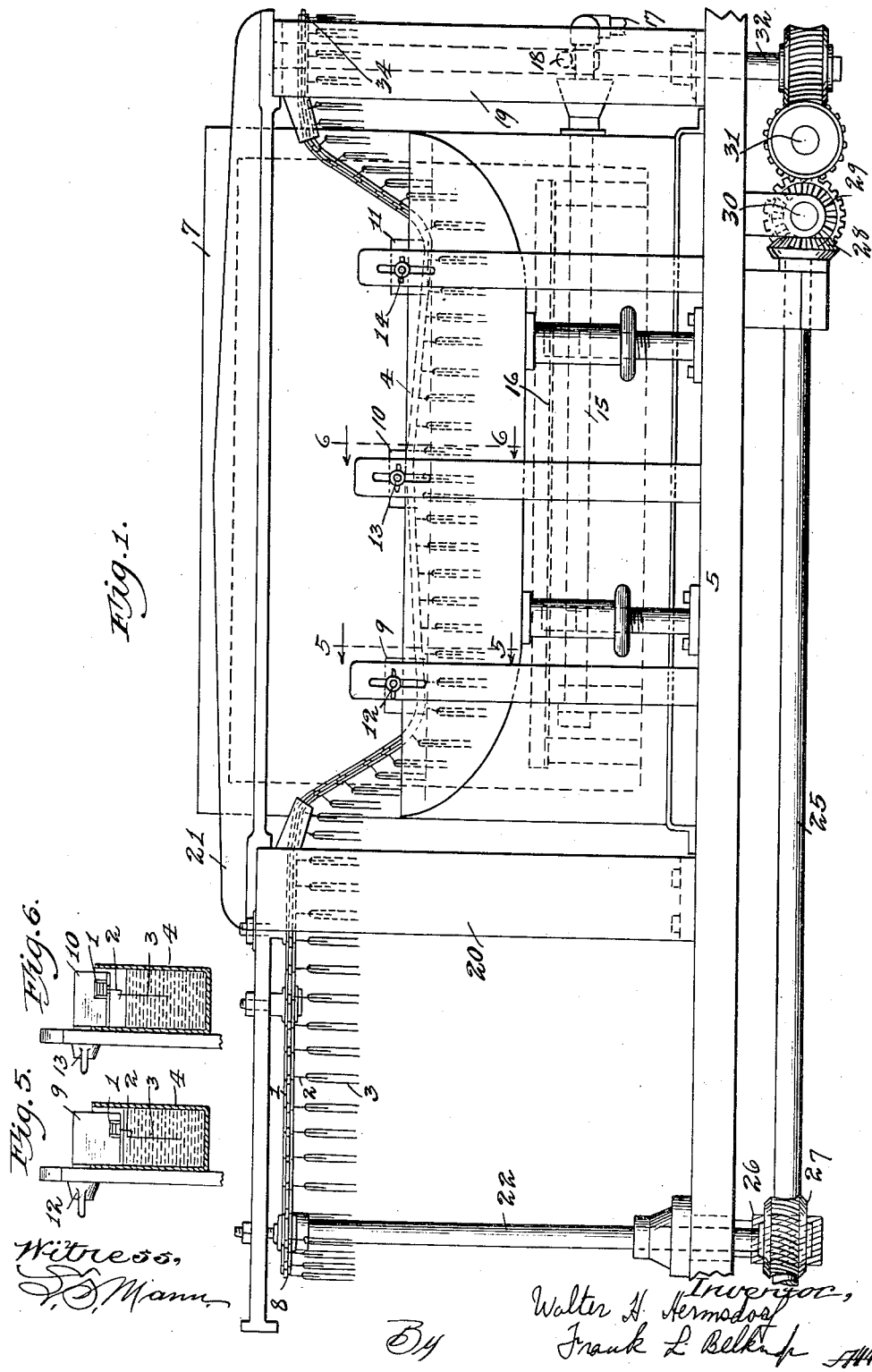

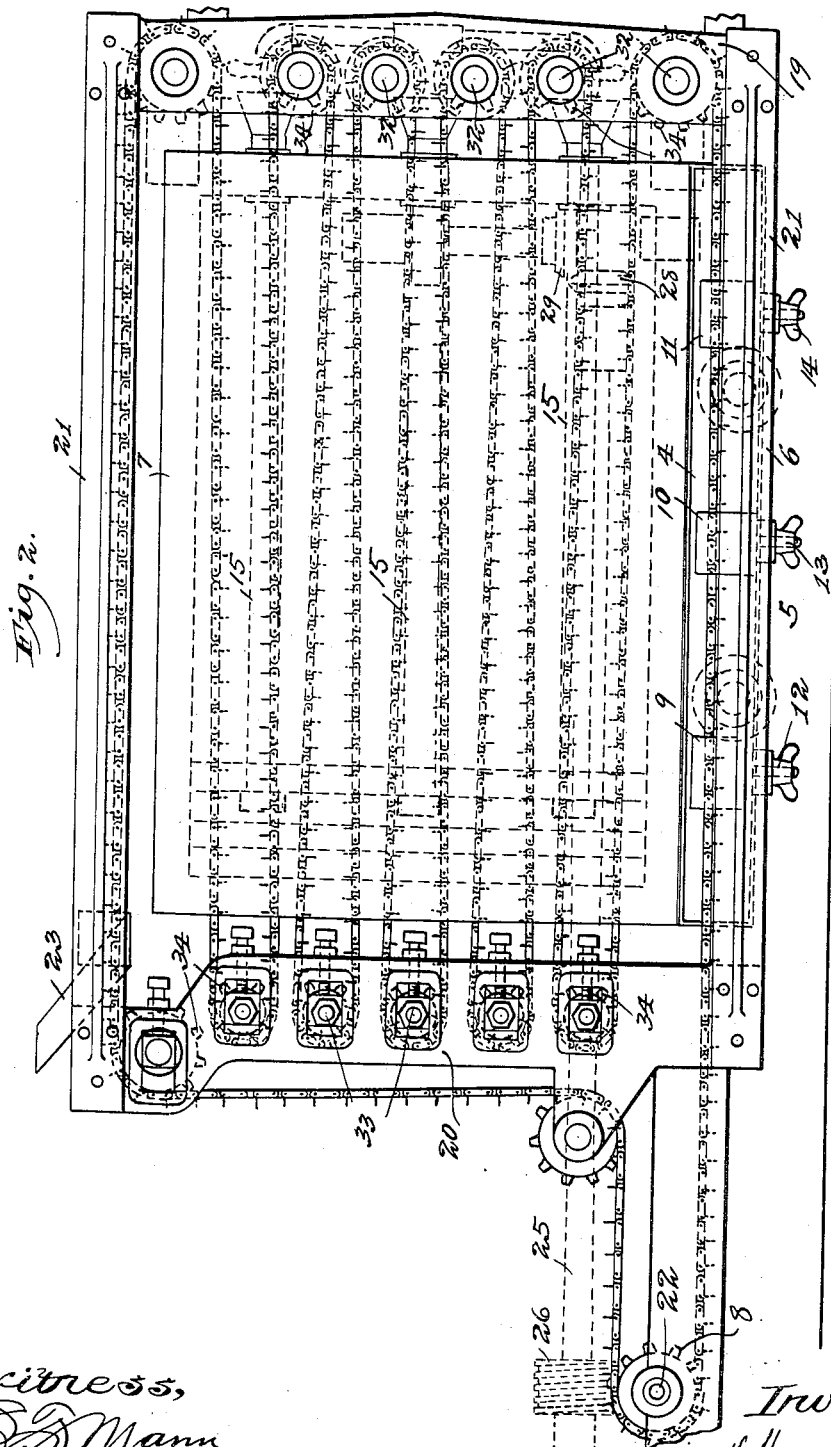

UNITED STATES PATENT OFFICE.

WALTER H. HERMSDORF, OF CHICAGO, ILLINOIS, ASSIGNOR TO THE HUMP HAIRPIN MANUFACTURING COMPANY, OF CHICAGO, ILLINOIS, A CORPORATION OF WEST VIRGINIA.

MACHINE FOR COATING ARTICLES.

1,319,867.            Specification of Letters Patent.       Patented Oct. 28, 1919.

Original application filed October 5, 1914, Serial No. 865,201. Divided and this application filed January 7, 1916, Serial No. 70,806. Renewed March 27, 1919. Serial No. 285,638.

*To all whom it may concern:*

Be it known that I, WALTER H. HERMSDORF, a citizen of the United States, residing in the city of Chicago, county of Cook, and State of Illinois, have invented certain new and useful Improvements in Machines for Coating Articles, of which the following is a specification.

This invention relates to a machine for coating articles and more particularly to a machine in which preformed articles such as hairpins and the like are automatically japanned or otherwise coated and this application is a divisional of my original application, Serial No. 865,201, filed October 5th, 1914.

The salient objects of the invention are to provide a machine of the character above referred to in which the japanning or other coating operation can be accomplished as a continuous process; to provide a machine in which the previously formed articles are automatically carried into coating position; to utilize the same mechanism for conducting the coated articles through the drying operation; to permit of an extra amount of the coating material being applied to a certain portion of each article without any material increase of equipment or number of operations; to provide an improved machine for coating or japanning hairpins or similar articles; and in general to provide a machine of the character above referred to in which a large number of articles such as hairpins or like articles can be rapidly and economically japanned or otherwise coated or operated upon.

In the drawings:

Figure 1 is a side elevation of a machine embodying my invention.

Fig. 2 is a top plan view of the parts shown in Fig. 1.

Fig. 3 is an end view of the carrying mechanism.

Fig. 4 is an end view taken from the opposite side of Fig. 3, certain parts being omitted.

Fig. 5 is a fragmentary sectional view on the line 5—5 of Fig. 1.

Fig. 6 is a fragmentary sectional view on the line 6—6 of Fig. 1.

In the particular embodiment of my invention shown in the drawings I have shown and described an apparatus for automatically japanning a three-legged hairpin although it is obvious that different wire or other articles than the one mentioned could be coated or otherwise treated by this mechanism. In general the machine comprises an endless chain or belt 1, having a plurality of hooks 2, upon which the individual hairpins 3 are placed either by hand or automatically and then conducted through the japanning and drying mechanisms hereinafter described in detail. The pins when placed upon the hooks 2 are first automatically carried through the japanning tank before passing to the drying oven.

As shown in Fig. 2, the japanning tank 4 is mounted on the base 5 of the oven frame 6, and is positioned at one side of the oven 7 and directly in the path of the chain 1 as it comes from the sprocket wheel 8. Therefore, the pins are carried first into the japanning tank and from there into the oven in the manner indicated in the plan view shown in Fig. 2. A plurality of bearings 9, 10 and 11 control the immersion of the pins into the fluid, these bearings being preferably adjustable by means of set screws 12, 13 and 14.

The adjustable feature of these bearings is further employed for the following purpose: The head or crown of the pin is sometimes found to require a heavier coating of japanning than the remainder of the pin, and in order to avoid the necessity of giving the entire pin a second coating, the center bearing 10 is adjusted to a higher level than the end bearings 9 and 11. This permits of the pin being completely immersed in the japanning fluid as it passes under the bearings 9 and 11, but as it passes the center bearing 10, its upper end is raised out of the fluid and subsequently re-immersed as it passes under the bearing 11. Thus the main body of the pin receives but one dipping into the fluid, while the crown portion of the pin is first immersed, then withdrawn out of the fluid and subsequently re-immersed to receive a second coating. In Figs. 5 and 6, the relative position of the pin as it passes the bearings 12 and 13 is clearly shown.

After passing through the tank 4, the pins are carried into the oven 7, the latter being heated to the desired temperature by means of burners 15 positioned below the deflector plates 16 and connected in the usual manner with the fuel supply pipe 17, the individual burners being controlled by separate shut-off valves 18. While the particular form of of the oven may be changed to meet the peculiar requirements of the articles treated, I preferably form it of such width that the carrier can be forced to travel the entire length of the oven several times. This permits of the pins, or other articles being treated, remaining in the oven for a considerable length of time without stopping the carrier. Thus in the particular construction shown, each pin is treated in the oven 7 the length of time necessary to pass its link the full length of the oven 10 times. As shown in Figs. 3 and 4, the oven is carried by a frame comprising the base 5, end uprights 19 and 20 bolted to the base 5 and secured at their upper ends by tie frame bars 21. The parts are all of comparatively simple construction and can be readily replaced or substituted.

As shown in Fig. 2, the pins being placed continuously on to the carrier at a point near the upper end of the shaft 22 are steadily advanced through the japanning tank 4 and drying oven 7 to the stripper plate 23, which serves to lift the pins from the carrier as it comes from the oven and discharging them into a suitable receptacle. The link from which the pin has been removed by the stripper plate 23 continues back around the sprocket wheel 8 on the shaft 22 and there receives another pin, and the cycle of operation again repeated.

The rate at which the endless chain or belt 1 is driven is proportioned to the time necessary for drying the coated articles. The drive train for transmitting the power of the main shaft 25 to the endless carrier 1 consists of the intermeshing worm gears 26 and 27, the vertical shaft 22 and the sprocket wheel 8. A plurality of supplementary drives are also obtained from a continuation of the shaft 25 which is connected by bevel gears 28 and 29 with the shafts 30 and 31, and a plurality of intermediate gear shafts 32 and 33. These last mentioned series of shafts are provided with sprocket gears 34 around which the chain 1 passes as it weaves its way back and forth through the drying oven 7.

The drive shaft 25 is preferably driven from some part of the forming mechanism so that the automatic coating and drying is accomplished at the same rate that the hairpins or other articles are formed. This feature, however, forms no part of the present application other than that the drying and coating mechanism *per se* is capable of receiving the pins when discharged from the forming mechanism although it is obvious they could be placed upon the hooks by hand labor without departing from the scope of my invention. Also various other changes in the details of construction and arrangement of the parts can be made and therefore I do not desire to limit the invention except as specified in the appended claims.

I claim as my invention:

1. In a hairpin machine, the combination with a trough for holding a coating fluid, of a carrier for conveying hairpins through said coating fluid, a drying chamber, means for moving said carrier backward and forward a relatively large number of times through said drying chamber to subject the coated pins to sufficient baking or drying and means for automatically delivering the baked or dried coated pins.

2. In a machine of the character described, the combination with a japanning tank, of a drying oven, an endless traveling conveyer for supporting hairpins, a main drive shaft, a supplementary drive shaft, sprockets for supporting said conveyer as it passes through the trough and a plurality of sprockets at either end of the driving element for supporting the carrier whereby the latter is caused to pass back and forth a plurality of times through the drying oven.

WALTER H. HERMSDORF.